United States Patent [19]

Dopyera

[11] 4,178,020
[45] Dec. 11, 1979

[54] LOCKING SLIP JOINT AND METHOD OF USE

[75] Inventor: Emil E. Dopyera, Houston, Tex.

[73] Assignee: Big-Inch Marine Systems, Inc., Houston, Tex.

[21] Appl. No.: 860,706

[22] Filed: Dec. 15, 1977

[51] Int. Cl.² .................. F16L 55/00; F16L 17/02
[52] U.S. Cl. ...................................... 285/18; 29/428; 277/190; 277/236; 285/96; 285/342
[58] Field of Search ............... 285/18, DIG. 21, 111, 285/322, 323, 106, 96, 342, 343, 339, 138, 144, 145, 146, 147, 148, 331, DIG. 11, DIG. 18; 277/117, 126, 190, 205, 236, 165; 29/428

[56] References Cited

U.S. PATENT DOCUMENTS

| | | | |
|---|---|---|---|
| 317,408 | 5/1885 | Moeser | 285/96 X |
| 3,649,032 | 3/1972 | Nelson | 277/165 |
| 3,713,675 | 1/1973 | White | 285/18 |
| 3,784,234 | 1/1974 | Mohr | 285/96 |
| 3,915,462 | 10/1975 | Bruns et al. | 277/190 |
| 3,933,376 | 1/1976 | Cugini | 285/145 X |
| 4,006,921 | 2/1977 | Mohr | 285/18 |

FOREIGN PATENT DOCUMENTS 2430248  1/1976  Fed. Rep. of Germany ........... 285/339

Primary Examiner—Dave W. Arola
Attorney, Agent, or Firm—Arnold, White & Durkee

[57] ABSTRACT

A locking slip joint has primary utility in the making up of a tie-in in pipeline laying and repair operations. In a preferred embodiment the slip joint comprises an inner sleeve telescopically received within an outer sleeve. Means for locking the sleeves together is disposed in an annulus between the sleeves and comprises a seal ring having annular teeth in communication with both sleeves. A pair of opposed tapered annular pistons engage mating recesses in the seal ring and are hydraulically actuated to deform the seal ring outwardly thereby embedding the teeth into both sleeves. The embedment provides an irreversible metal-to-metal seal.

11 Claims, 6 Drawing Figures

LOCKING SLIP JOINT AND METHOD OF USE

BACKGROUND OF THE INVENTION

1. Field of the Invention

The present invention relates to the connection of tubular members, more specifically to the connection of pipelines in subsea environments during the laying or repairing of such pipelines. In particular, the invention relates to a locking slip joint useful in pipeline tie-ins.

2. Description of the Prior Art

The laying or repairing of underwater pipelines presents a number of situations requiring tie-ins. It is well known in the art that such tie-ins may be facilitated by the use of slip joints for providing axial translation between end connectors, ball joints, repair welds or the like. It is desirable that such slip joints provide a seal having a structural integrity and reliability at least equal to that of the remainder of the pipeline. It is also desirable that the slip joint provide relative rotation prior to locking to facilitate bolt hole alignment.

Slip joints of the general type under discussion are described in U.S. Pat. No. 3,649,032 to Nelson and in U.S. patent application Ser. No. 738,609 to Martin. The apparatus of the present invention is primarily designed to afford improved reliability and to facilitate remote actuation while maintaining the many advantages of the devices described in the above-mentioned patent and patent application.

SUMMARY OF THE INVENTION

In accordance with the present invention a locking slip joint is provided for connecting conduits. The illustrated embodiment comprises a locking slip joint for connecting subsea pipelines. The slip joint includes inner and outer sleeves each connected to one of the pipe sections to be joined. Disposed between the sleeves is an annular space which encloses the mechanism for sealing the sleeves. This mechanism includes an annular seal ring having teeth contacting both the inner and outer sleeves. The seal ring includes a control web and opposed tapered recesses adapted to receive mating tapered annular pistons. Hydraulic actuation of the pistons forces them into the tapered recesses of the seal ring thereby outwardly expanding the seal ring. This expansion results in the embedment of the teeth into the sleeves to form a metal-to-metal seal. Preparatory to setting the seal the inner sleeve may be axially moved within the outer sleeve by impressing an hydraulic force on a flange member made integral with the inner sleeve. Also preparatory to setting the seal the inner sleeve may be rotated relative to the outer sleeve either manually or by means of a mechanical manipulator.

In an alternative embodiment the seal ring is formed with one recess which is adapted to receive a single piston. The web is positioned in contact with a wall portion of the annulus so that the seal ring will be held in place during actuation of the piston.

One feature of the apparatus of the invention is the provision of a seal ring which, when embedded, forms a solid piece integral with the sleeves. One aspect of this feature is that the seal formed by embedding the seal ring is not dependent upon O-rings or a seal formed along sliding surfaces.

Another feature of the invention is the provision of a method for connecting telescoping pipe sections by expanding a seal ring within an annulus between the pipes to produce a metal-to-metal seal.

Other features of the invention will become apparent from a study of the specification, claims and drawings.

DESCRIPTION OF THE PREFERRED EMBODIMENT

Figure 1:
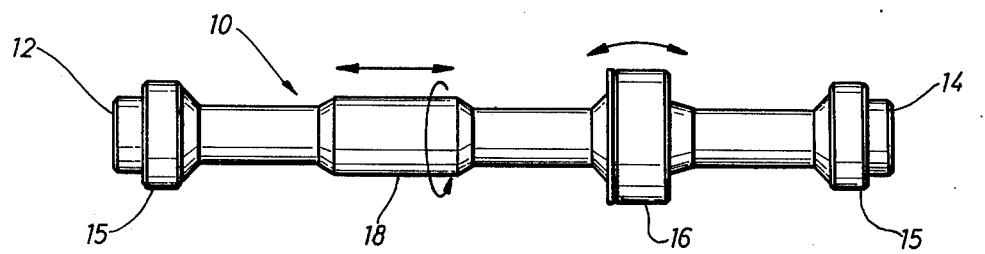
FIGS. 1 and 2 are schematic representations of two subsea pipeline systems which utilize slip joints of the type disclosed herein.
Figure 2:
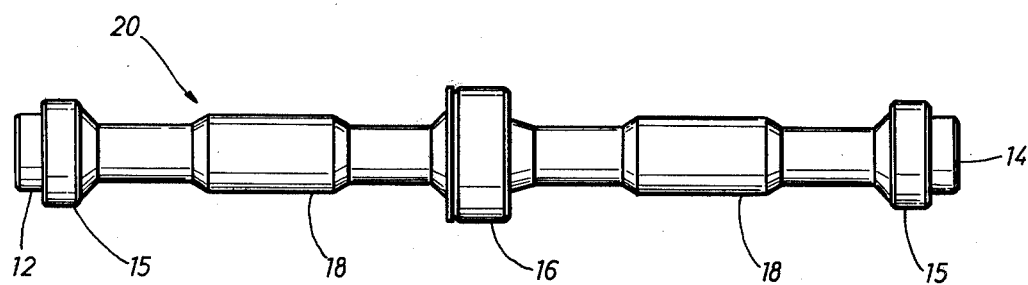

Referring to FIGS. 1 and 2 there are illustrated two subsea tie-in systems utilizing one or more slip joints of the type herein described. FIG. 1 depicts a pipeline connection 10 utilized in connecting pipe sections 12, 14 remaining after the intermediate portion has been damaged and cut away. The connection includes a pair of end connectors 15, a ball joint 16 and a slip joint 18 providing axial translation and rotation about its center line. FIG. 2 depicts a similar tie-in utilizing a pair of slip joints 18. Other arrangements of end connectors, ball joints, slip joints and like connector members may be utilized to effect tie-ins according to the requirements of the situation presented.

Figure 3:
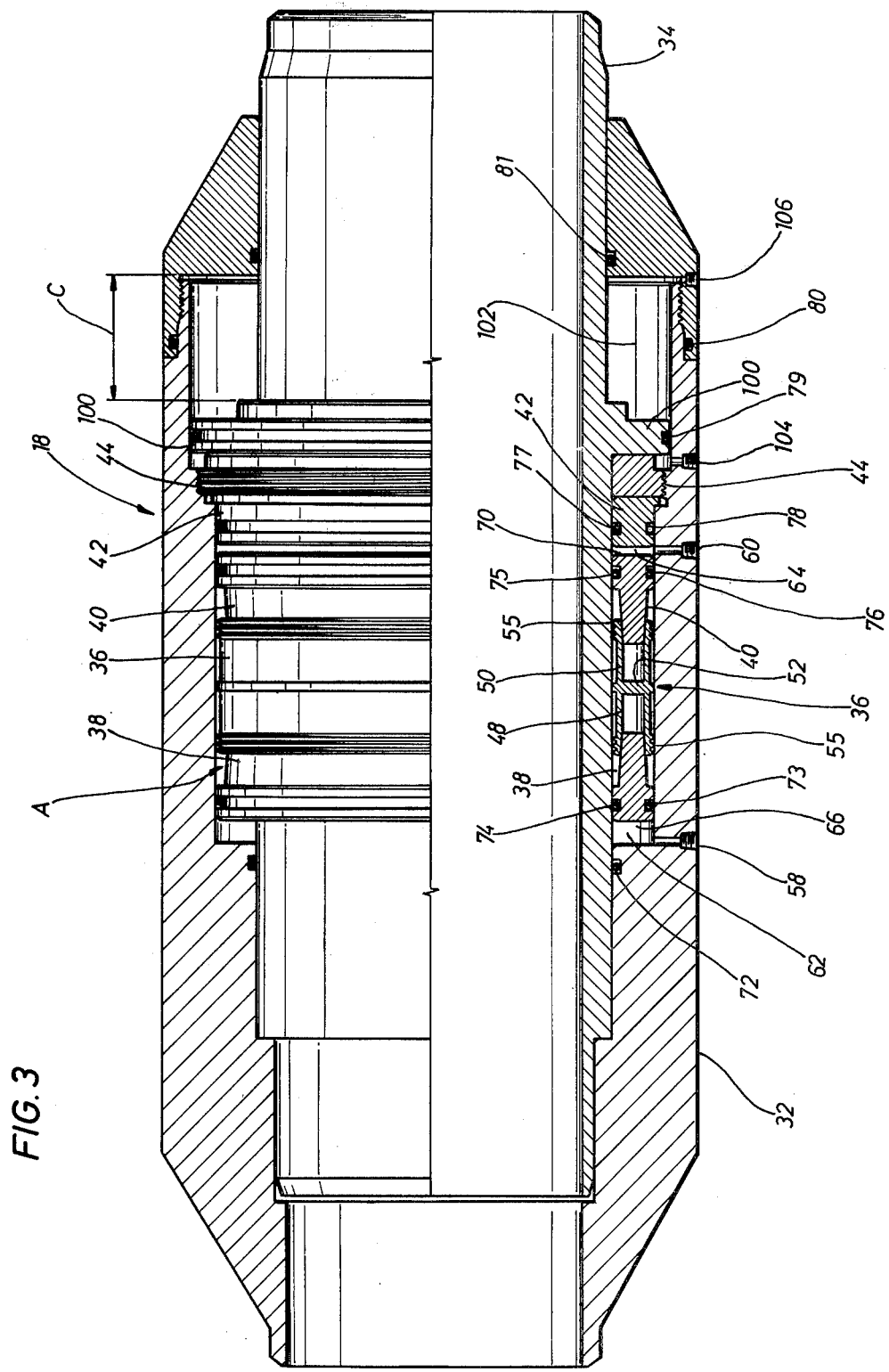
FIG. 3 is a partially sectioned view of a preferred embodiment of the slip joint of the instant invention.

FIG. 3 illustrates a slip joint 18 constructed in accordance with the preferred embodiment of the instant invention. Slip joint 18 comprises an outer sleeve 32 which telescopically receives an inner sleeve 34. The locking seal is effected in an open annulus A which is disposed between sleeves 32 and 34. The locking elements comprise a seal ring 36, a pair of tapered annular pistons 38, 40 and a locking member 42 which is held in place by a locking nut 44.

In the illustrated embodiment seal ring 36 comprises an annular metal ring having outwardly opening, tapered annular recesses 48, 50 separated by a structural web member 52. Recesses 48, 50 are each formed by first and second arm members which extend substantially parallel to the centerline of sleeves 32, 34. The seal ring arms include a plurality of radially projecting teeth 55 which, as explained below, are adapted to embed in the portions of sleeves 32 and 34 forming annulus A.

Tapered pistons 38 and 40 are adapted for hydraulic actuation by pressurized fluid introduced through hydraulic fluid supply ports 58, 60. Hydraulic fluid entering port 58 fills a volume 62 and works on the face 66 of piston 38. Hydraulic fluid entering port 60 fills volume 64 and acts on face 70 of piston 40. Locking member 42 provides a fixed back face for defining volume 64.

Figures 4, 5:
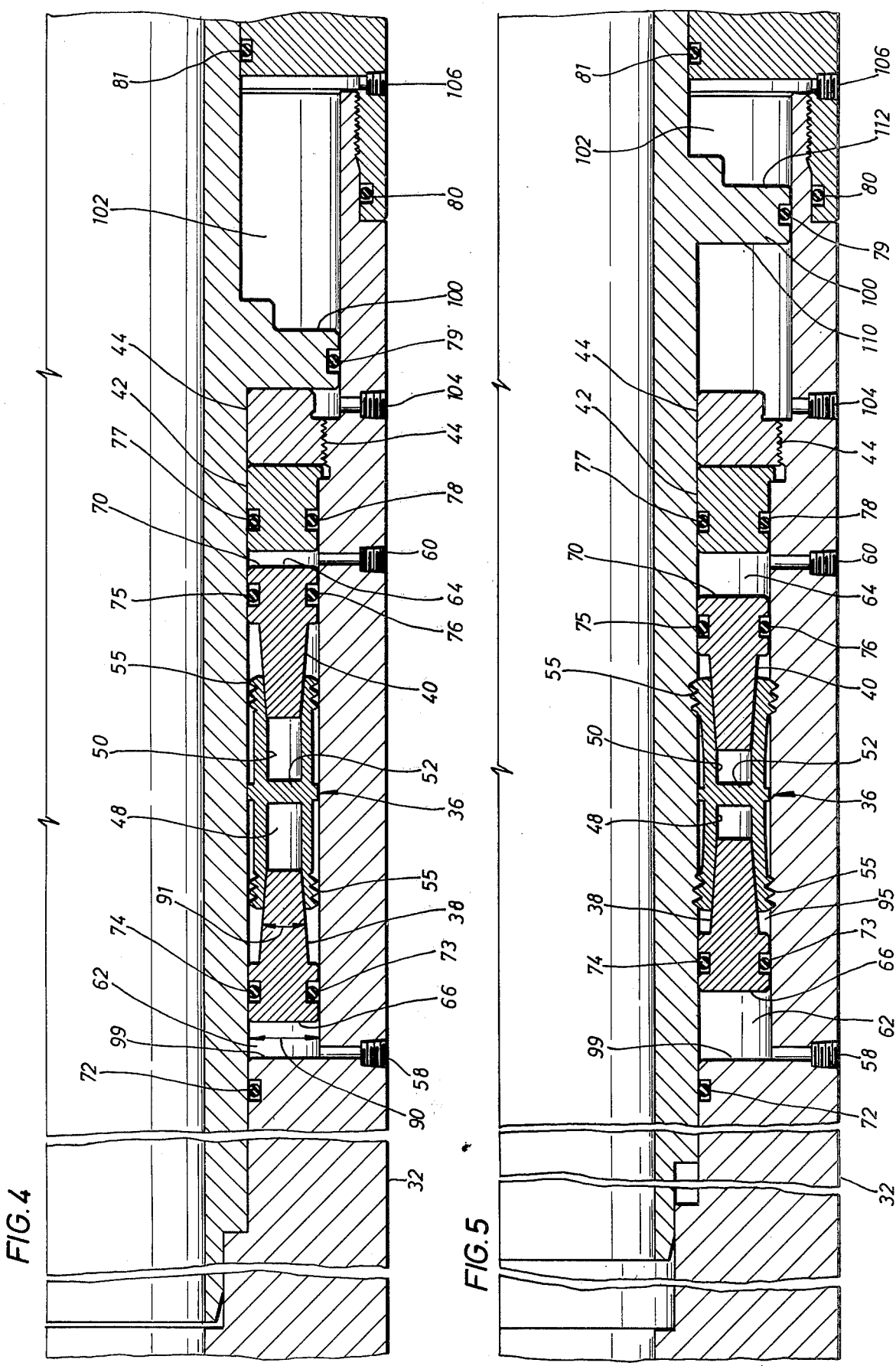
FIG. 4 is an enlarged cross section of a portion of the slip joint of FIG. 3 showing the pistons in the non-actuted or open position.
FIG. 5 is a view similar to FIG. 4 showing the pistons in the actuated or closed position and showing the inner sleeve displaced to the right.

As mentioned above, it is desirable for the slip joint to provide means allowing relative axial translation of the sleeves and means allowing relative rotation of the sleeves about their center line. In the illustrated embodiment the amount of available axial travel is designated by the reference character C (FIG. 3). That is, prior to locking the slip joint by setting the seal, inner sleeve 34 may be moved within outer sleeve 32 by as much as the distance C. This travel is accomplished by hydraulically moving an annular flange 100 which is connected to inner sleeve 34. As best shown in FIGS. 4 and 5, flange 100 is positioned within an annular space or cavity 102 which is formed between sleeves 32 and 34. A pair of hydraulic fluid supply ports 104, 106 are located at each end of annular space 102 and are adapted to introduce pressurized fluid into annular space 102 to act on the opposed surfaces 110, 112 of flange 100. FIG. 4 illustrates flange 100 in its extreme left position as it abuts locking nut 44. FIG. 5 illustrates flange 100 after it has been moved to the right by means of pressurized fluid introduced through port 104 and acting on surface 110.

Inner sleeve 34 is made rotatable within outer sleeve 32 by means of sliding contact surfaces. This rotation is desirable in many situations so that bolt holes of adjoining pipe sections may be aligned. In a preferred manner of practicing the invention, the rotational alignment is made manually before setting the seal; however, a mechanical manipulator may be used for remote rotation.

OPERATION

Once the axial translation and rotation have been accomplished so that the slip joint is set at the desired position, the locking seal may be set according to the following preferred mode of operation. Piston 38, 40 are first actuated by fluid introduced through ports 58, 60 so that they drive forward into recesses 48, 50 in seal ring 36, thereby radially expanding seal ring 36 and embedding teeth 55 into sleeves 32, 34. This actuated or closed condition is best illustrated in FIG. 5. Once the pistons have been moved to the closed postion, the hydraulic lines may be removed from ports 58 and 60 and volumes 62 and 64 (now expanded) are filled with a hard-setting epoxy resin or other suitable filler material to prevent the pistons from backing out of the recesses 48, 50. In a preferred mode of practicing the invention, the filler material utilized is No. 2275 KEMSET liquid pressure grout, manufactured by Don Henry Enterprises of Houston, Tex. While the use of a filler is preferred, this step may not prove necessary where the tolerances are such that the pistons do not tend to creep out of locking engagement within recesses 48, 50.

As best shown in FIGS. 3-5 a number of O-rings 72-81 are utilized in the illustrated embodiment. However, it is important to note that the metal-to-metal seal between the sleeves 32, 34 is not dependent upon the integrity of O-rings, but is achieved solely by the embedment of teeth 55 and the integrity of structural web 52. After the slip joint has been in operation for a period time O-rings 72, 73, 74 may deteriorate, thereby allowing pipeline fluids at pressures up to 1200 psi to leak into the area designated by reference numeral 95 in FIG. 5. However, the seal of the instant invention prevents pressurized fluid from passing beyond web 52. The fluid may not pass along the surfaces of sleeves 32, 34 because of the seal formed by embedment of teeth 55. The fluid may flow into the area of recess 48 along grooves formed by galling in the mating sliding surfaces of piston 38 and recess 48. However, this route of fluid escape is closed off by web 52. Thus, even if the O-rings fail and even if leak paths form along the sliding surfaces of the piston-recess interface, the seal prevents the flow of fluid beyond the web 52.

EXAMPLE I

Two twelve-inch pipe sections were connected utilizing a slip joint in accordance with the instant invention. The annulus A formed between inner sleeve 34 and outer sleeve 32 was approximately eight inches long and had a radial dimension 90 (FIG. 4) of 1.165 inches. Pistons 38, 40 had an angle 91 (FIG. 4) of approximately 4°. Pistons 38, 40 and seal ring 36 were made from 4140 heat treated steel with the pistons being somewhat softer so as to reduce the likelihood of locking along the sliding surfaces of pistons 38, 40 and seal ring 36. Seal ring 36 was approximately four inches long and had a radial dimension of approximately 1.165 inches so as to slideably fit within annulus A. The maximum length of axial travel C (FIG. 3) was four inches. Preparatory to setting the seal, flange 100 was displaced by means of introducing hydraulic fluid into ports 104, 106 at relatively low pressure. Rotation of inner sleeve 34 within outer sleeve 32 was accomplished manually. Hydraulic fluid was then introduced into ports 58, 60 at a pressure of 4,500 PSI resulting in displacement of pistons 38 and 40, expansion of seal ring 36 and embedment of teeth 55. After removing the hydraulic fluid from volumes 62, 64, No. 2275 KEMSET liquid pressure grout was introduced into volumes 62 and 64 to prevent pistons 38, 40 from backing out of recesses 48, 50.

ALTERNATIVE EMBODIMENT

Figure 6:
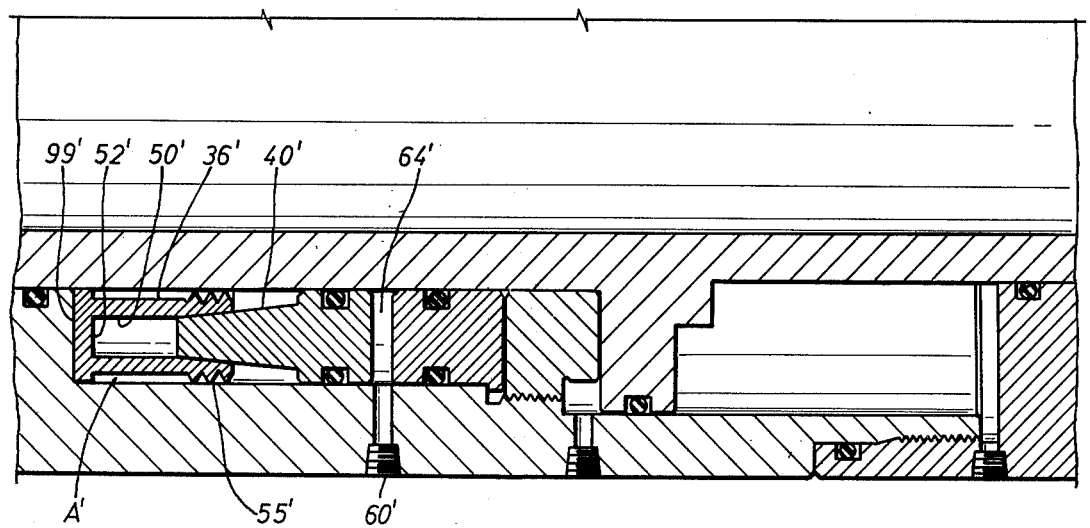
FIG. 6 is a view of a portion of a slip joint including an alternative seal ring and piston arrangement.

FIG. 6 illustrates a portion of a slip joint incorporating an alternative seal ring and piston arrangement. According to this alternative embodiment a seal ring 36' and an annular piston 40' are disposed within an annulus A'. Piston 40' may be identical to the previously described pistons. Annulus A' is an open area disposed between the inner and outer sleeves and is preferably somewhat shorter than annulus A depicted in FIGS. 3-5, for example, six inches long. Seal ring 36' is similar to the previously described seal ring but has the portion to the left of the web 52' removed. Thus seal ring 36' includes only one recess 50' which receives a single piston 40'. In order to set the seal, pressurized hydraulic fluid is introduced into space 64' through supply port 60'. Piston 40' is thereby urged to the left and into recess 50', thereby expanding seal ring 36' and embedding teeth 55'. Once the hydraulic fluid is introduced the web 52' is moved into contact with wall 99' which defines the left wall of annulus A'. Thus the force produced by the hydraulic fluid is transmitted to wall 99' during the seal setting operation. Other aspects of the alternative embodiment of FIG. 6 are the same as illustrated in FIGS. 3-5.

While the slip joint of the present invention has been described in connection with tie-ins utilized in subsea pipeline laying and repair operations, it is understood that the principles of the present invention are applicable to other kinds of conduit connections. Furthermore, numerous variations from the structure and procedure described herein may fall within the scope of the present invention.

What is claimed is:

1. A locking slip joint for connecting first and second tubular members comprising:
   an outer sleeve having one end for connecting to a first tubular member;
   an inner sleeve having one end for connecting to a second tubular member and having its other end disposed within said outer sleeve, said outer and inner sleeves providing a common central passage therethrough;
   said outer sleeve having a precisely formed annular surface on its inside diameter and said inner sleeve having a precisely formed annular surface on its outside diameter, said annular surfaces being opposed in a spaced-apart relationship to define an annulus and being formed from deformable metal adapted to receive a continuous annular tooth by embedment;

seal means disposed within said annulus and comprising:

a ring member encircling said inner sleeve and including inner and outer joined arms defining therebetween a tapered annular recess adapted to forcibly receive a mating member for deforming the inner arm inwardly into engagement with said inner sleeve and deforming the outer arm outwardly into engagement with the outer sleeve, the engaging surface of each arm including at least one continuous annular tooth for embedding into the respective sleeves to form metal-to-metal seals;

a mating member having a tapered portion for mating with said recess of said ring member; and means for forcing said mating member into said recess to effect deformation of said ring member and embedment of the annular teeth into the sleeves.

2. A slip joint as claimed in claim 1 including means for adjusting the relative axial positions of said inner and outer sleeves preparatory to setting the seal.

3. A slip joint as claimed in claim 1 wherein said seal ring includes opposed tapered recesses separated by a web.

4. A locking slip joint for connecting first and second tubular members comprising:

an outer sleeve having means for connecting to a first tubular member;

an inner sleeve having means for connecting to a second tubular member and being at least partially disposed within said outer sleeve, said outer and inner sleeves providing therebetween an annulus and providing a common central passage therethrough;

seal means disposed within said annulus and comprising:

a ring member encircling said inner sleeve and including inner and outer joined arms defining therebetween a tapered annular recess adapted to forcibly receive a mating member for deforming the inner arms inwardly into engagement with said inner sleeve and deforming the outer arm outwardly into engagement with the outer sleeve, the engaging surfaces of said arms including means for embedding into the respective sleeves to form metal-to-metal seals;

a mating member having a tapered portion for mating with said recess of said ring member, said mating member comprising an annular tapered piston movable substantially parallel to the centerline of the slip joint; and means for forcing said mating member into said recess to effect deformation of said ring member and embedment of the arms into the sleeves.

5. A slip joint as claimed in claim 4 including means for hydraulically actuating said piston.

6. A locking slip joint for connecting first and second tubular members comprising:

an outer sleeve having means for connecting to a first tubular member;

an inner sleeve having means for connecting to a second tubular member and being at least partially disposed within said outer sleeve, said outer and inner sleeves providing therebetween an annulus and providing a common central passage therethrough;

seal means disposed within said annulus and comprising:

a ring member encircling said inner sleeve and including inner and outer joined arms defining therebetween a tapered annular recess adapted to forcibly receive a mating member for deforming the inner arm inwardly into engagement with said inner sleeve and deforming the outer arm outwardly into engagement with the outer sleeve, the engaging surfaces of said arms including means for embedding into the respective sleeves to form metal-to-metal seals;

a mating member having a tapered portion for mating with said recess of said ring member;

means for forcing said mating member into said recess to effect deformation of said ring member and embedment of the arms into the sleeves; and means for adjusting the relative axial positions of said inner and outer sleeves preparatory to setting the seal including a flange integral with one of said sleeves and disposed within a cavity formed between said inner and outer sleeves, means for introducing fluid under pressure into said cavity whereby said flange may act as a piston serving to effect relative axial movement between the sleeves.

7. A locking slip joint for connecting first and second tubular members comprising:

an outer sleeve having means for connecting to a first tubular member;

an inner sleeve having means for connecting to a second tubular member and being at least partially disposed within said outer sleeve, said outer and inner sleeves providing therebetween an annulus and providing a common central passage therethrough;

seal means disposed within said annulus and comprising:

a ring member encircling said inner sleeve and including two pairs of inner and outer joined arms with the two pairs being separated by a web to define two opposed tapered annular recesses adapted to forcibly receive mating members for deforming the inner arms inwardly into engagement with said inner sleeve and deforming the outer arms outwardly into engagement with the outer sleeve, the engaging surfaces of each of said arms including at least one annular tooth for embedding into the respective sleeves to form metal-to-metal seals;

a pair of tapered annular pistons adapted for movement substantially parallel to the center line of said slip joint and into the opposed recesses of said ring member and wherein portions of said annulus serve as spaces for holding fluid under pressure utilized to force said pistons into said recesses; and means for forcing said mating member into said recess to effect deformation of said ring member and embedment of the arms into the sleeves.

8. A method of connecting first and second tubular members comprising the steps of:

providing an integral slip joint comprising inner and outer sleeves with each sleeve being adapted for connection to one of said tubular members, said slip joint having a precisely formed annulus of substantially constant clearance between said sleeves, said annulus having disposed therein a seal ring including inner and outer joined arms defining therebetween a tapered annular recess, and a tapered piston slideably received within said recess;

adjusting the inner and outer sleeves by relative axial and rotational movement;

connecting the inner and outer sleeves to the respective tubular members;

introducing a pressurized fluid into said annulus to force said piston into said seal ring recess thereby setting a metal-to-metal seal between said inner and outer sleeves by deforming the inner arm into embedding engagement with the inner sleeve and deforming the outer arm into embedding engagement with the outer sleeve.

9. A method as claimed in claim 8 including the steps of removing the fluid from said annulus after setting the seal and introducing a filler into the space occupied by the fluid.

10. A method as claimed in claim 8 including the step of securing the piston against further movement after setting the seal.

11. A method of connecting first and second tubular members comprising the steps of:

providing a slip joint comprising inner and outer sleeves with each sleeve being adapted for connection to one of said tubular members, said slip joint having an annulus between said sleeves, said annulus having disposed therein a seal ring including inner and outer joined arms defining therebetween a tapered annular recess, and a tapered piston slideably received within said recess;

adjusting the inner and outer sleeves by relative axial and rotational movement;

connecting the inner and outer sleeves to the respective pipe sections;

preparatory to setting the seal, introducing a pressurized fluid into a cavity formed between the sleeves to displace an annular flange connected to one of the sleeves and disposed within the cavity, thereby providing axial movement between the sleeves;

introducing a pressurized fluid into said annulus to force said piston into said seal ring recess thereby setting a metal-to-metal seal between said inner and outer sleeves by deforming the inner arm into embedding engagement with the inner sleeve and deforming the outer arm into embedding engagement with the outer sleeve.

* * * * *